Patented Oct. 24, 1922.

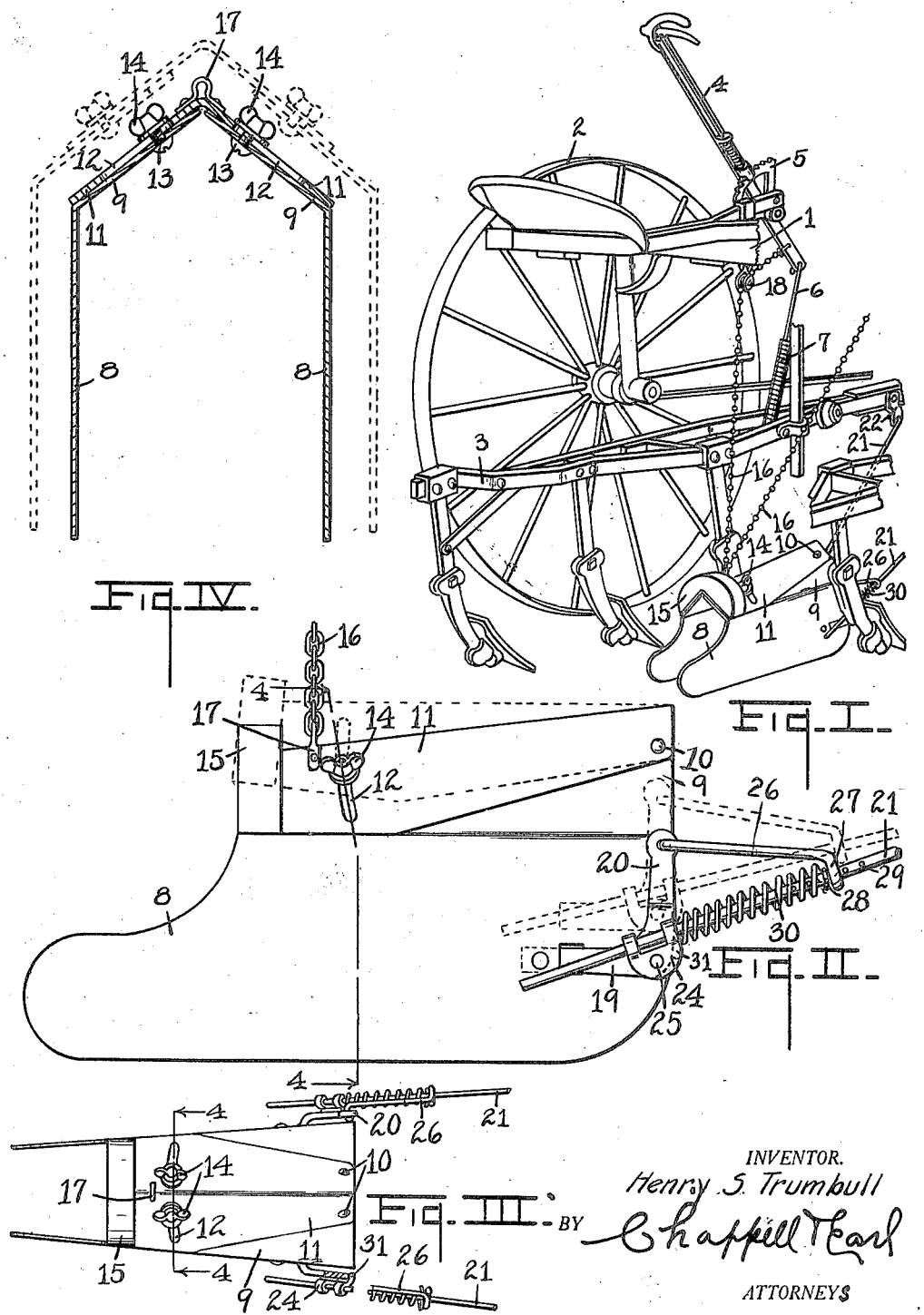

1,433,249

UNITED STATES PATENT OFFICE.

HENRY S. TRUMBULL, OF VICKSBURG, MICHIGAN.

CULTIVATOR FENDER.

Application filed January 3, 1922. Serial No. 526,606.

*To all whom it may concern:*

Be it known that I, HENRY S. TRUMBULL, a citizen of the United States, residing at Vicksburg, county of Kalamazoo, State of Michigan, have invented certain new and useful Improvements in Cultivator Fenders, of which the following is a specification.

This invention relates to improvements in cultivator fenders.

The main objects of this invention are to provide an improved fender for cultivators and like instruments which may be adjusted to the work.

Second, to provide in a cultivator fender an improved support whereby the fender is effectively supported in operative relation and at the same time will pass obstructions without injury to the fender.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawings, forming a part of this application in which:

Fig. I is a fragmentary perspective view of a cultivator equipment with my improved fender, only such parts of the cultivator being shown as are deemed necessary to illustrate a practical adaptation of my improved fender to a cultivator or like implement.

Fig. II is a side elevation of my improved fender, the suspending chain and draft rods being partially broken away, the movement of the fender on the draft rods being indicated by dotted lines.

Fig. III is a plan view, portions of the draft rods being broken away.

Fig. IV is a transverse section on a line corresponding to line 4—4 of Figs. II and III, the adjustment of the fender being indicated by dotted lines.

In the drawings, similar reference characters refer to similar parts throughout the several views, and the sectional views are taken looking in the direction of the little arrows at the ends of the section lines.

Referring to the drawings, 1 represents a cultivator frame, 2 one of the carrying wheels and 3 one of the cultivator shovel sections. This is controlled by the lever 4 coacting with the segment 5, the lever being connected to the cultivator by the rod 6 and spring 7. These parts, however, form no part of my invention.

My improved fender comprises a pair of blades 8 having upwardly and inwardly inclined wings 9 at their upper edges. These wings are pivoted at 10 to the forward end of the top member 11 which has downwardly diverging sides disposed at an angle corresponding to the angle of the wings 9, so that the wings telescope on the under sides thereof.

Adjacent the rear end of the top member are segmental slots 12, engaged by bolts 13 on the wings 9. These bolts are provided with thumb nuts 14 so that the wings may be adjusted to regulate the distance between the rear ends of the blades.

In the structure illustrated a weight 15 is mounted on the rear end of the fender. The suspending chains 16 are secured to the eye 17 at the rear of the fender and passed over pulleys 18 to the operating levers 4, so that when a lever is manipulated to raise a shovel section 3 the fender is also raised. On the sides of the blades at their forward ends are brackets 19 having upwardly projecting arms 20. The draft rods 21 are connected at their forward ends to the hangers 22 on the cultivator shovel frames 3. The rear ends of these draft rods are slidably engaged with the coupling members 24 pivoted at 25 to the brackets 19. The draft links 26 carried by the arms 20 of the brackets 19 are provided with the eyes 27 through which the draft rods are disposed. Draft pins 28 coact with these eyes, the rods having a plurality of holes 29 so that the draft pins may be adjusted therein.

Coiled springs 30 are arranged on the draft rods between the coupling members 24 and these pins 28 so that when the fender passes over an obstruction it is raised against the tension of these springs and the springs tend to hold it in proper relation to the ground. Stops 31 limit the rearward swing of the coupling members on the pivots.

With this arrangement of parts the fender is effectively supported in relation to the ground and at the same time may pass obstructions without injury to the fender and it may also be quickly adjusted to the requirements of the plants being cultivated.

Having thus described my invention, what I claim is new and desire to secure by Letters Patent, is:

1. In a cultivator fender, the combination of a pair of blades having inwardly projecting upwardly inclined wings, a top member having downwardly diverging sides embracing said wings and to which their forward ends are pivoted, said top member having segmental slots therein and said wings carrying bolts engaging said slots whereby the blades are supported for lateral adjustment on their pivots, a suspending cable connected to said top member, brackets secured at the forward ends of said blades and provided with upwardly projecting arms, coupling members pivotally mounted on said brackets, said coupling members being provided with stops limiting their rearward swinging movement, draft rods slidably mounted in said coupling members, draft links carried by said arms and provided with eyes through which said draft rods are arranged for longitudinal movement, draft pins on said draft rods coacting with said links, and coiled springs arranged on said rods between said pins and said coupling members.

2. In a cultivator fender, the combination of a pair of blades having inwardly projecting upwardly inclined wings, a top member having downwardly diverging sides embracing said wings and to which their forward ends are pivoted, said top member having segmental slots therein and said wings carrying bolts engaging said slots whereby the blades are supported for lateral adjustment on their pivots, brackets secured at the forward ends of said blades and provided with upwardly projecting arms, coupling members pivotally mounted on said brackets, draft rods slidably mounted in said coupling members, draft links carried by said arms and provided with eyes through which said draft rods are arranged for longitudinal movement, draft pins on said draft rods coacting with said links, and coiled springs arranged on said rods between said pins and said coupling members.

3. The combination of a fender, a suspending means for said fender, brackets secured at the forward ends of said blades and provided with upwardly projecting arms, coupling members pivotally mounted on said brackets, said coupling members being provided with stops limiting their rearward swinging movement, draft rods slidably mounted in said coupling members, draft links carried by said arms and provided with eyes through which said draft rods are engaged for longitudinal movement, draft pins on said draft rods coacting with said links, and coiled springs arranged on said rods between said draft pins and said coupling members.

4. The combination of a fender, brackets secured at the forward ends of said blades and provided with upwardly projecting arms, coupling members pivotally mounted on said brackets, draft rods slidably mounted in said coupling members, draft links carried by said arms and provided with eyes through which said draft rods are engaged for longitudinal movement, draft pins on said draft rods coacting with said links, and coiled springs arranged on said rods between said draft pins and said coupling members.

5. The combination of a fender, a suspending means for said fender, brackets on said blades and provided with upwardly projecting arms, coupling members pivotally mounted on said brackets, said coupling members being provided with stops limiting their rearward swinging movement, draft rods slidably mounted in said coupling members, draft links with which said draft rods are engaged for longitudinal movement, draft pins on said draft rods coacting with said links, and coiled springs arranged on said rods between said draft pins and said coupling members.

6. The combination of a fender, brackets on said blades and provided with upwardly projecting arms, coupling members pivotally mounted on said brackets, draft rods slidably mounted in said coupling members, draft links with which said draft rods are engaged for longitudinal movement, draft pins on said draft rods coacting with said links, and coiled springs arranged on said rods between said draft pins and said coupling members.

7. In a cultivator fender, the combination of a pair of blades having inwardly projecting upwardly inclined wings at their upper edges, and a top member having downwardly diverging sides to which the forward ends of said wings are pivoted, said top member sides having segmental slots therein and said wings carrying bolts engaging said slots whereby the blades are supported for lateral adjustment on their pivots.

8. In a cultivator fender, the combination of a pair of blades having inwardly projecting upwardly inclined wings at their upper edges, a top member having downwardly diverging sides to which the forward ends of said wings are pivoted, and means for adjustably securing the rear ends of said wings to said top member.

In witness whereof, I have hereunto set my hand and seal.

HENRY S. TRUMBULL. [L. S.]